United States Patent [19]

Hoo

[11] 3,958,234
[45] May 18, 1976

[54] INTERACTIVE STYLUS SENSOR APPARATUS FOR GAS PANEL DISPLAY

[75] Inventor: Stanley Shu-Ku Hoo, Kingston, N.Y.

[73] Assignee: International Business Machines Corporation, Armonk, N.Y.

[22] Filed: June 23, 1975

[21] Appl. No.: 589,105

[52] U.S. Cl. .......................... 340/324 M; 178/18; 178/19; 340/166 EL
[51] Int. Cl.² .......................................... G06F 3/14
[58] Field of Search ............................. 178/18–20; 340/324 A, 324 M, 166 EL, 173 PL; 315/169 TV; 250/213 A

[56] References Cited
UNITED STATES PATENTS

| | | | |
|---|---|---|---|
| 3,182,291 | 5/1965 | Nassimbene | 178/18 |
| 3,505,666 | 4/1970 | Thorpe | 340/324 A |
| 3,559,307 | 2/1971 | Barrakette et al. | 178/18 |
| 3,680,078 | 7/1972 | Baskin et al. | 178/18 |
| 3,846,580 | 11/1974 | Brenner | 178/19 |
| 3,887,767 | 6/1975 | Miller | 178/18 |

Primary Examiner—Marshall M. Curtis
Attorney, Agent, or Firm—Harry T. Berriman

[57] ABSTRACT

Sensor apparatus for taking position signals from either ignited or extinguished cell positions at intersections of the column and row coordinate conductors of a gas tube display screen associated with an information handling system. The sensor apparatus includes a hand-held stylus having a plurality of spaced plates that capacitively interact with the adjacent row-column conductors as signal potentials are applied thereto by the normal gas panel addressing circuitry. The capacitive interaction of the plates causes signals to be picked up from the row-column conductors, the signals being differentially amplified to give a detect signal of the stylus position on the display which has a high degree of resolution, the detect signal in combination with data from the addressing circuitry giving a row-column (X-Y) coordinate address indication of the stylus on the panel for utilization in any associated information handling system.

13 Claims, 12 Drawing Figures

INTERACTIVE STYLUS SENSOR APPARATUS FOR GAS PANEL DISPLAY

RELATED APPLICATIONS

Application Ser. No. 268,219 to T. N. Criscimagna and A. O. Piston for "Method and Apparatus for Gas Display Panel", assigned to the assignee of the present application, discloses a gas panel and its associated structure and circuitry and provides background information that may be helpful in understanding the general area of this invention.

SENSOR APPARATUS FOR GAS PANEL DISPLAY

This invention relates to sensor apparatus utilized with a gas panel display for generating signals representative of the coordinate position of a hand-held stylus on the display, the stylus having a multi-plate capacitive signal pickup structure and associated circuitry of unique configuration. Although shown particularly applied to a gas panel display the apparatus can be readily adapted to any display system having matrix type address lines to each display element.

BACKGROUND OF THE INVENTION

Gas panel display systems of the type to which this invention relates are well known, but it will be helpful to review the features and terminology that particularly apply to this invention. Gas panel displays have two glass plates that are spaced apart by a seal to contain an ionizable medium. A set of spaced horizontally extending "row" conductors are located on one glass plate and a set of vertically extending "column" conductors are located on the other plate. When a suitable voltage is applied between one of the row conductors and a column conductor ionization occurs between the spaced crossover point of the two conductors and light is emitted. The crossover points are called cells and a display pattern is formed by ionizing selected cells. The operation of initially ionizing a cell is called writing. The operation of removing the wall charges from a previously written cell is called erasing. A write pulse is formed by the difference between a pulse applied to the selected horizontal conductor and a pulse applied to the selected vertical conductor. These voltage amplitudes are called half-select voltages, and cells along a row or column conductor that receive a half-select voltage are said to be half-selected. The write half-select voltage must be high enough to produce a full-select voltage to ionize the selected cell, but it must be low enough not to produce an unintended write operation on any other half-selected cells. After the write operation, periodic output of the cell is sustained by an alternating polarity voltage that is called a sustain voltage. The sustain voltage is applied simultaneously to all cells and the previously written cells ionize and accumulate charge for the next sustain operation, but the previously erased cells remain unionized.

In the gas panel displays transistor switches are provided for each one of the row wires and for each one of the column wires. The switches are controlled by addressing counters which connect the individual row and column wires to selectively receive voltages for write and erase operations.

The very accurate resolution of the differential capacitive stylus and associated circuitry of this invention uses the conventional gas panel addressing circuits to provide an indication of the position of the stylus on the display. Hand-held sensors utilized with cathode ray tube displays are well known. Some of these are referred to as light pens and are manually held to the display and receive a light signal form the adjacent illuminated area of the cathode ray tube display. Associated components of the display operate in response to the light signal to identify the coordinate address of the pen. Light pen system used with cathode ray tube systems tend to have slow response in following the movement of the light pen from one illuminated area to another. Sensor systems reacting to the electron beam of the cathode ray tube rather than the illuminated spot are also known. There are many application programs that use a signal telling that a light pen or electron beam sensor has been held to the display or that it has been held to a particular location on the display. An electron beam position sensor for a cathode ray tube display is disclosed in U.S. Pat. No. 3,413,515. Light pen sensors have also been adapted for gas panel displays. A light pen system for a gas panel is disclosed in U.S. Pat. No. 3,851,327.

SUMMARY OF THE INVENTION

A hand-held stylus or probe is provided for a user to point to displayed image entries on a gas panel display, the display including a matrix of horizontally extending spaced "row" conductors and a similar matrix of vertical extending "column" conductors, the row and column conductors being separated by an ionizable medium. The stylus is responsive to either illuminated or extinguished cell areas established at each spaced crossover of any pair of the orthogonally extending row and column conductors or cell lines. The stylus and associated circuitry enables the stylus location on the gas panel to be accurately determined. The stylus has at its tip three or more equally spaced, but mutually isolated, symmetrically arranged coplanar plates. In operation, a voltage pulse is rippled selectively into each cell line of each gas panel axis, first for example, from left to right in the column lines, and next from top to bottom in the row lines. The plates in the stylus capacitively couple the rippled vertical column and horizontal row voltages into circuitry associated with the stylus. The stylus makes a detect when the cell line or lines directly under the stylus tip is being pulsed. The cell position of the particular vertical and horizontal cell lines that are being pulsed at the moment of "detect" are the position of the stylus on the panel.

Greatly improved resolution of the "detect" position is obtained by reason of the three or more spaced planar areas of the stylus and associated circuitry. When the stylus is placed on the display, one of the spaced plates will be to the leftward of one of the column lines of the desired cell and a companion plate will be towards the right of the column line. Similarly, one of the spaced plates will be above the row line of the desired cell while a companion plate will be towards the bottom. When the cell lines are rippled in the row direction, a difference voltage will be generated between the pair of spaced plates above and below the desired cell, the difference voltage being of substantial similar magnitude but time displaced. The difference voltage is combined in an associated differential amplifier which effectively senses its equal magnitude and this sensing in combination with a sensed ripple signal on a possible third plate of the pair signals a row sense operation. Similarly when the cell lines are rippled in a column direction, a difference voltage will be sensed between another pair of the spaced plates which, in combination with a sensed ripple signal on a possible other plate, signals a column sense. The sense in the row and column position signals the sensed cell position.

It is accordingly an object of this invention to provide an improved hand-held stylus and associated circuitry for a gas panel display which has high resolution, improved signal to noise response, and is responsive to detect either ignited or extinguished areas of the display. Other features and advantages of the improved sensor apparatus will be understood from the description of the specific system shown in the drawings.

INTRODUCTION

Figure 1:
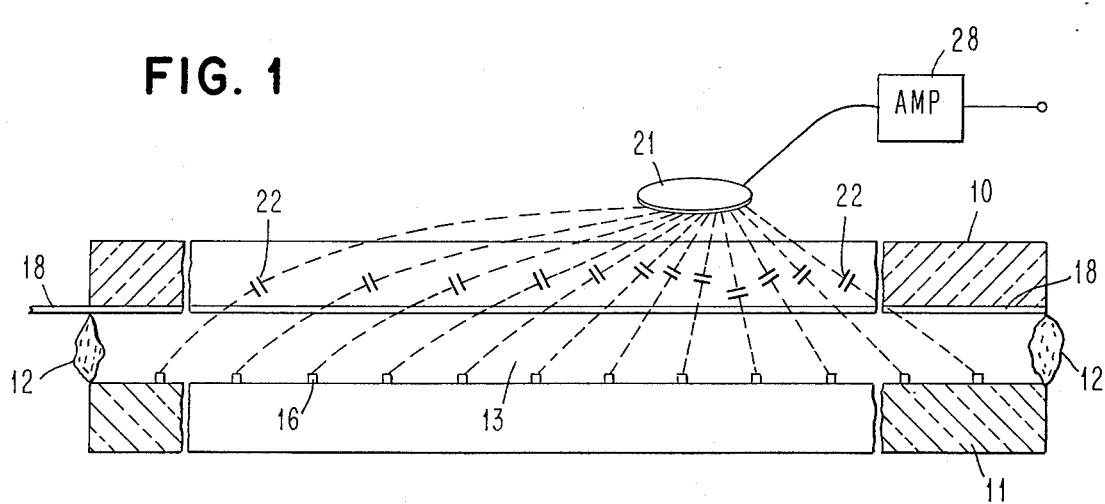
FIG. 1 is a diagrammatic partial cross-sectional representation of a simplified gas panel structure and shows diagrammatically the capacitive coupling between a single plate sense probe and the column lines or conductors of the display.

Referring now to FIG. 1 a simplified representation (not to scale) of a gas panel display is shown. The display includes a top rectangular, transparent, flat glass panel 10 and a back rectangular, transparent, flat glass panel 11 which are maintained in a spaced relationship by seal material 12 extending between the edges of the panel to form a cavity 13 therebetween. A suitable ionizable and illuminable gas is present in the cavity 13. Extending in spaced relationship on the inner surface of the back panel is a series of so-called "column" conductors or lines 16 and similarly extending in spaced relationship on the inner surface of the top panel is a series of "row" conductors or lines 18. The row and column lines extend at right angles to each other and at each coordinate spaced crossover point of a row or column a so-called "cell" is formed. When a suitable voltage is applied between one of the row lines and one of the column lines, the portion of the gas immediately therebetween at the intersecting cell position is ionized or "fired" and light is emitted. It is thus evident that by the selective application of proper voltages to the row and column lines any pattern of desired cells can be illuminated to form letters, numbers or any desired kind of graphic display. Only those portions of the gas panel display and associated circuitry necessary to an understanding of the improved panel sensor or stylus are going to be described and for a complete description of gas panel structure and operation reference is made to the previously mentioned application Ser. No. 268,219 of T. N. Criscimagna and A. O. Piston for "Method and Apparatus for Gas Panel Display". Once a cell is "fired" it may be maintained in this state by suitable "sustain" voltages applied to the row and column conductors or it may be "erased" or turned off, both these operations being described in detail in the above-mentioned patent application.

It is evident that if a stylus has a single planar plate area such as 21 held in coplanar position above the surface of the top plate 10, there will be capacitive coupling between the plate and each of the column lines 16, for example, as indicated by the phantom capacitors 22, the intervening glass and air acting as a dielectric. The capacitive coupling is, of course, greatest between the plate and the column line of the cell immediately thereunder, the coupling becoming less and less to the column lines further out toward the edges of the panel.

Figure 2:
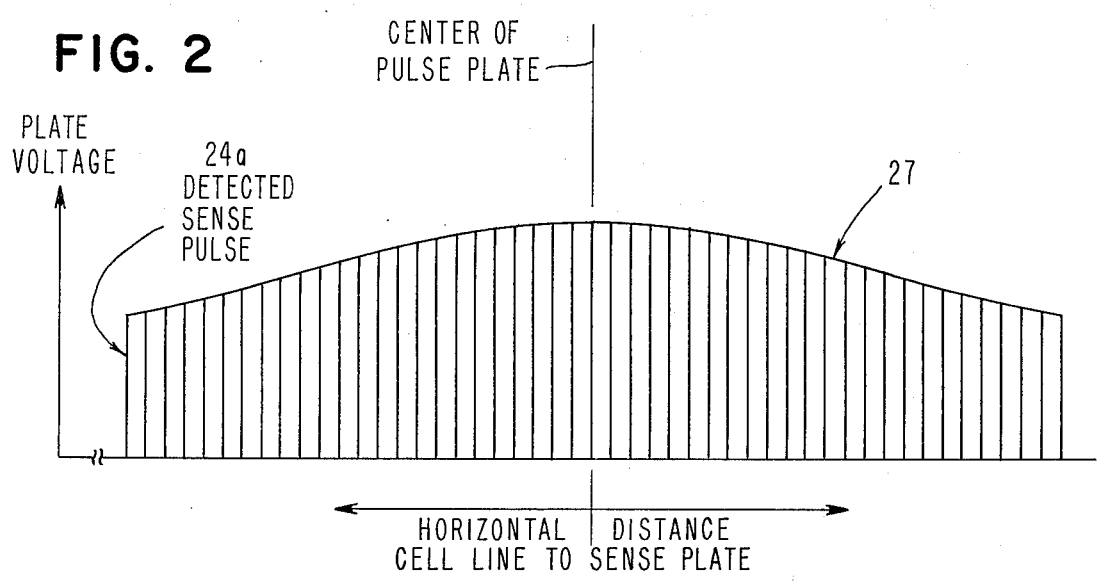
FIG. 2 shows the voltage envelope that will be induced in the single plate probe of FIG. 1 as a ripple or sense signal is applied in turn from left to right in the column lines of FIG. 1 as represented by FIG. 2A.
Figures 2A, 10:
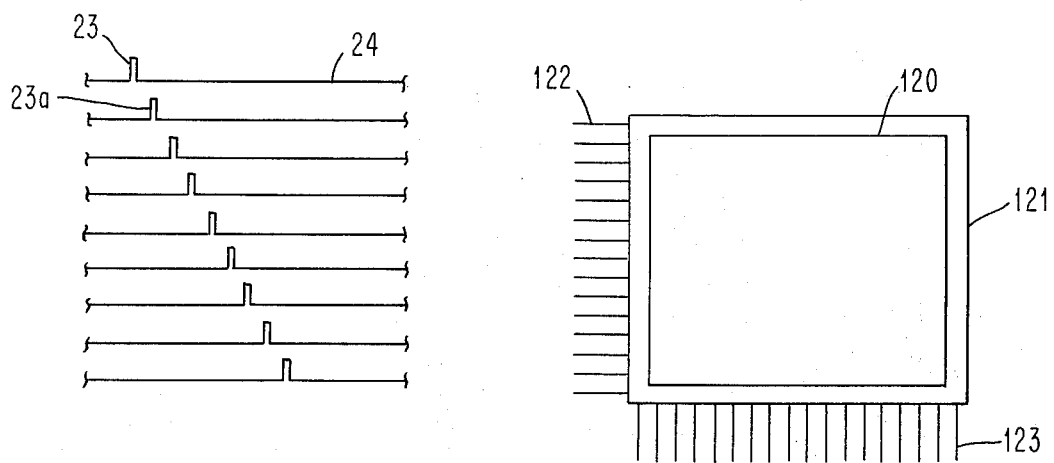
FIG. 10 is a simplified representation of the improved sense stylus adapted for use as a data entry device for an information handling system.

Referring now to FIGS. 2 and 2A, if a suitable voltage pulse 23 is applied to the leftmost column conductor as indicated by timing waveform 24, it will be evident that by reason of the capacitive coupling mentioned above, a corresponding signal 24a will be induced in the plate 21. If we continue to successively apply the same magnitude sense pulse 23a, in turn to the next to the leftmost column line and then successively, in turn, to the succeeding column lines from left towards the right as indicated by succeeding waveforms in FIG. 2A, signals will be induced capacitively from each succeeding column line 16 to the plate 21. By reason of increased capacitive coupling between the column lines closer to the plate 21, this rippling of the sense pulse from left to right in the column lines induces progressively larger signals in the plate, with the largest magnitude signal being induced when the column wire directly under the plate or stylus is pulsed. As the column wire from the plate position towards the right is successively "rippled", a lesser and lesser signal will again be induced in the plate. The capacitive character of the plate 21 in combination with the characteristics of an associated amplifier 28 linked thereto causes the individual ripple pulses to form a pulse train envelope signal 27 on the output of the amplifier.

The envelope curve 27 in FIG. 2 can, of course, be used to locate the plate 21 position by noting when the signal envelope reaches maximum level and by noting which column line is being pulsed at that time. The row lines can similarly be rippled from top to bottom to generate a "row" maximum signal, the peak row and column signal designating the row and column coordinates of the stylus.

Utilization of the single plate stylus and its resultant signal envelope curves as shown in FIG. 2 gives poor results or accuracy in pinpointing the stylus position on the display, however. This results from a number of factors. It was mentioned previously that the representative gas panel shown in FIG. 1 was not to scale. The spacing for the column wires as shown in much greater than the spacing present in an actual dispay system. The spacing between adjacent lines of a representative gas panel may be in the range of 0.030 inches, while the thickness of the glass plate 10 may be in the range of 0.25 inches. It is thus evident that the capacitive coupling between the single plate stylus and a number of the column lines, for example, adjacent thereto is relatively similar. Accordingly, the magnitude of the sensed stylus signal for any number of lines in the immediate vicinity thereof is in the same general range making the envelope 27 substantially flat at its top area and giving corresponding poor stylus resolution. Additionally, since the column wires 16 in the bottom plate 11 are further from the stylus 21 than the row wires 18 carried on the top plate 10 of the display, and the row wires act to partially block or "shield" the signal form the column wires 16, the stylus circuitry accordingly has to compensate for the resultant difference in absolute magnitude of the sense envelope dependent on whether the display is being "rippled" for the sense operation in the row or column direction. Additionally, during the gas panel operation, "sustain" voltages are continuously applied to all the row and column conductors to maintain illuminated or fired cells in this state until "erased". Accordingly, these other voltages such as "sustain" in the gas panel will appear as noise riding on the sense pulses 24a, etc. resulting in a low signal to noise ratio S/N of the desired stylus information.

Figures 3, 4, 5:
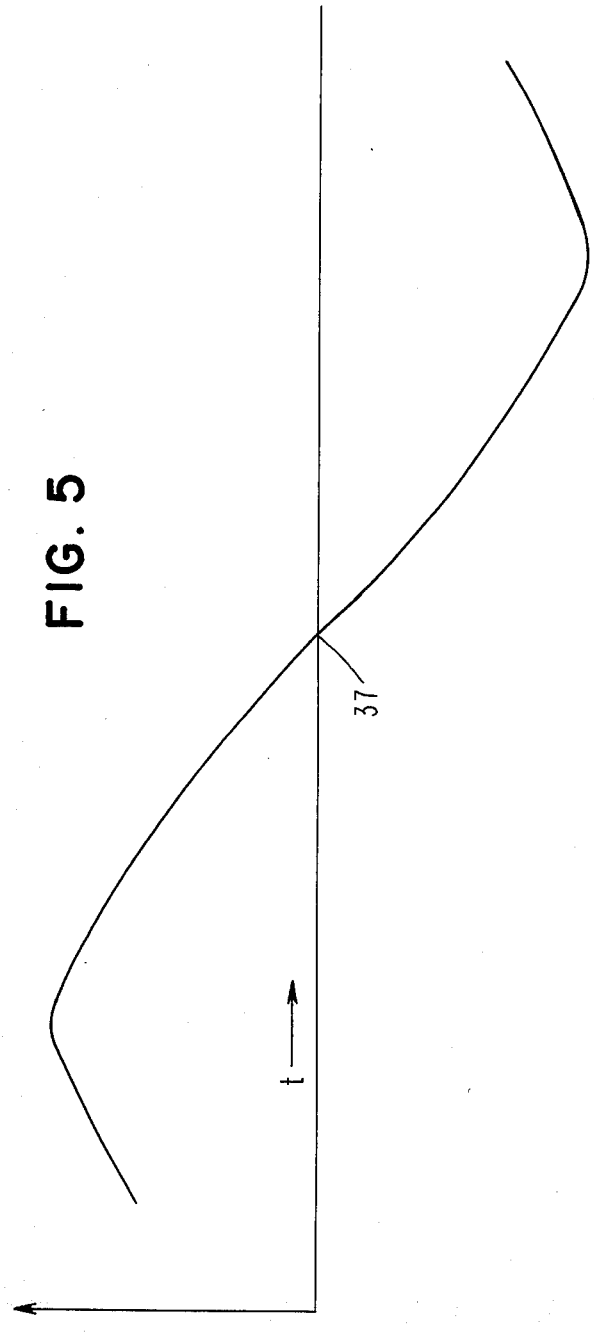
FIG. 3 is a simplified representation of a sense stylus having two spaced equal area sense plates, a representative column line extending orthogonally between the plates.
FIG. 4 is a waveform representation of the signal induced in the two sense plates of FIG. 3 as ripple or sense signals are applied in turn from left to right in the column lines.
FIG. 5 is a waveform representation of the signal resulting from the combination of the sense plate signals of FIG. 4 in a differential charge amplifier.

In attempting to overcome the disadvantages of the single plate capacitive stylus 21, examine the case of a stylus having two spaced, coplanar plates A and B of equal area and diagramatically illustrated in FIG. 3. The spacing between plates A and B is preferably equal to the diameter of the plates. Assume the two-plate stylus to be in a position on the display so that, for example, a column line 31 extends under plate A, next column line 32 is substantially equally spaced between plates A and B, while the next column line 33 to the right extends under plate B. If the column lines of the display are then rippled by a sense voltage from left to right to effect a stylus sensor operation, the sequential application of the ripple voltage will generate on plate A a signal envelope 35 of substantially similar shape to that previously described for the single plate stylus (see FIG. 2). Similarly a substantially similar shape envelope 36 will be generated on the right plate B, the signal envelope being time displaced to the right on the diagram since the column conductor under plate B is rippled later in time than the column line under plate A so that its signal envelope correspondingly peaks later. If the signal envelopes on plates A and B are separately applied to respective inputs of a differential charge amplifier, the output therefrom is equal to the difference in voltage level of the applied A and B plate voltages at each instant of time. FIG. 5 represents the waveform of output of the amplifier on the same time base as FIG. 4 and it is evident that at the time interval when the column conductor 32 between plates A and B is rippled, the A and B signal outputs being of substantially similar magnitude as indicated before substantially cancel each other out and result in a sense signal output signal at zero as indicated at point 37 in FIG. 5. The differential amplifier output always approaches zero potential when the cell line between plates A and B is being pulsed or rippled. During the rippling of other lines, the voltages induced on plates A and B are not equal and there is some output from the differential amplifier. It is clear that the detect region near position 37 of FIG. 5 is very sharply defined rather than the rounding top of the curve 27 of the single plate stylus as shown in FIG. 2 and, accordingly, the twoplate stylus is capable of much higher resolution. The signal/noise ratio is also enhanced due to the common mode rejection characteristics of the two plate differential arrangement. Signals, such as sustain, which is present on all the row and column conductors, are sensed equally by both plates A and B and thus generating no net differential signal. Additionally, the difference in sensed signal level between "rippling" the row and column conductors on the top and back plates 10 and 11, respectively, does not present any problem as in the single plate stylus because it is not the absolute magnitude of voltages induced on plates A and B that is being sensed, but only the difference in magnitude.

The two-plate sense stylus is not practical for actual usage because when used as a hand-held sensor there is no quarantee that the two plates A and B will straddle the desired cell line to give the improved operation noted above. When a line joining the center lines of plates A and B is exactly parallel to the row or column conductors, the output of the differential amplifier is always zero because each conductor is always equivalent to plate A and plate B so that it is impossible to determine if this is actually a detect point.

DESCRIPTION OF THE PREFERRED EMBODIMENTS

Figure 6:
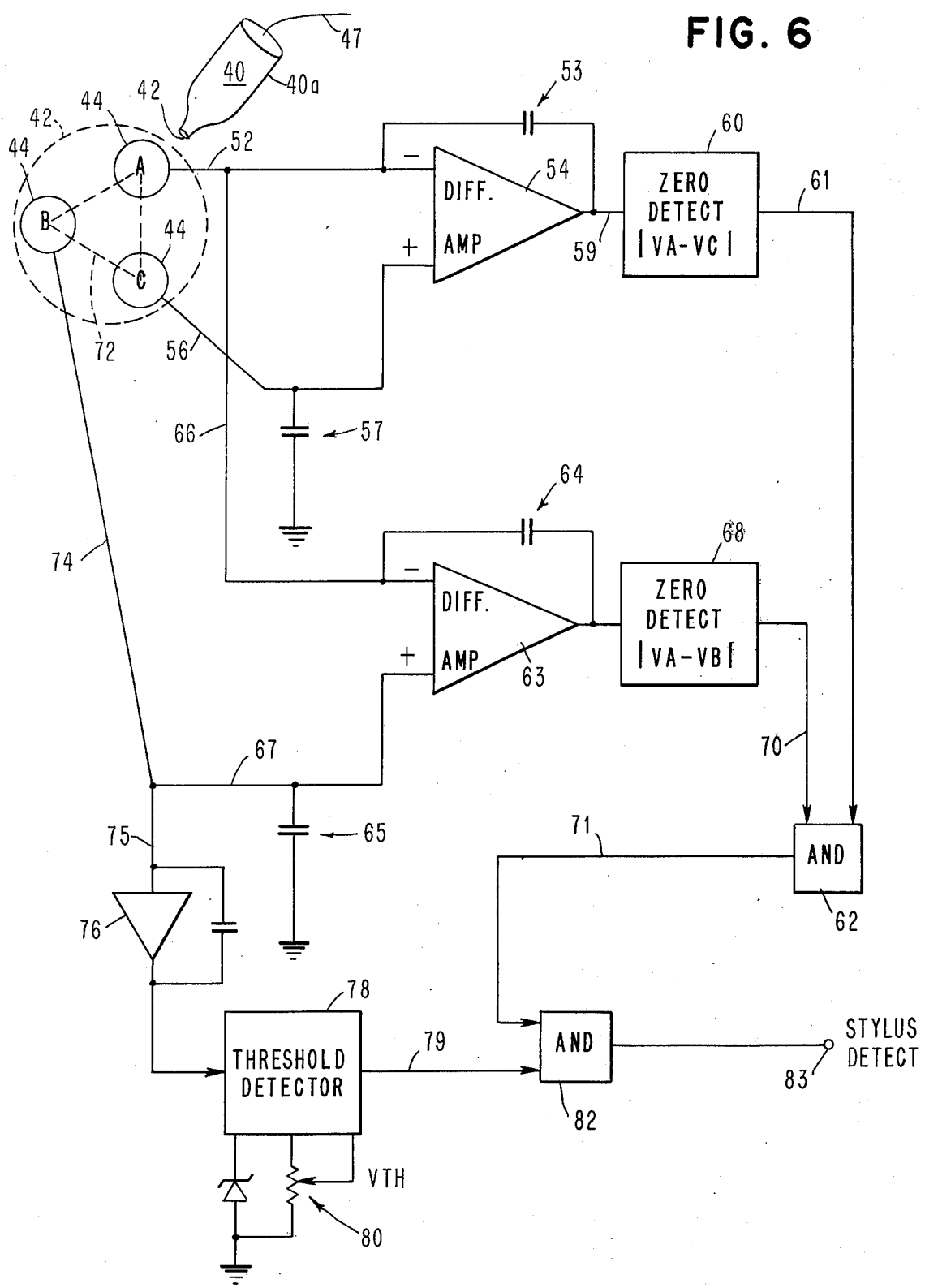
FIG. 6 is a circuit diagram of the hand-held stylus and associated circuitry of the invention.
Figure 11:
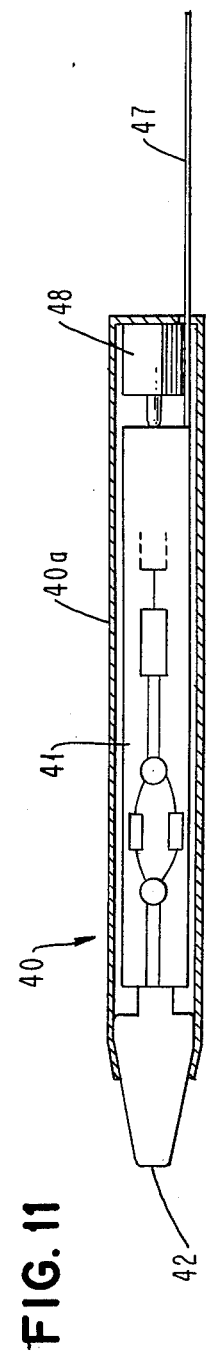
FIG. 11 is section view of the hand-held sensing stylus.

It has been found that a hand-held sensor or stylus (and associated circuitry) having three or more equal spaced sense plates will provide all the above-noted differential capacitive aspects of the two-plate stylus and also overcomes the above-noted deficiencies thereof which render its use restrictive. Referring now to FIGS. 6 and 11 there is shown a hand-held stylus 40 having a cylindrical hollow section 40a within which is arranged an assembly of a printed circuit supporting member 41 having attached thereto an extending reduced stylus tip area 42. The stylus tip has its representative diameter in the range of approximately ⅛ inch adapted for engagement with the surface of a gas panel display. In the gas panel, the representative spacing between successive column conductors may be approximately 0.030 inch and similarly, the spacing between successive row conductors may be approximately 0.030 inch. Insulatably supported in spaced relationship to each other in the circular tip area 42 of the stylus are three spaced capacitive sense plates 44A, 44B and 44C as shown in an enlarged view of the tip 42 in FIG. 6. The plates 44 A, B and C are all of equal planar areas and the spacing between adjacent plates is preferably in the range of the diameter of a plate. The circuitry associated with the stylus 40 and shown to the right in FIG. 6 may be arranged on the circuit board assembly 41 and suitable cable connections 47 from the end thereof supply power to the enclosed circuitry and feed sense or detect signals from the stylus to other associated circuitry. The stylus tip 42 and associated circuit board 41 are slidably mounted in the housing 40a (see FIG. 11) so that when the tip engages the display panel, the tip and board assembly slide in the housing with the end of the board actuating an associated pressure responsive switch 48. The closing of switch 48 initiates the stylus sense operation as will be described later.

Figure 7:
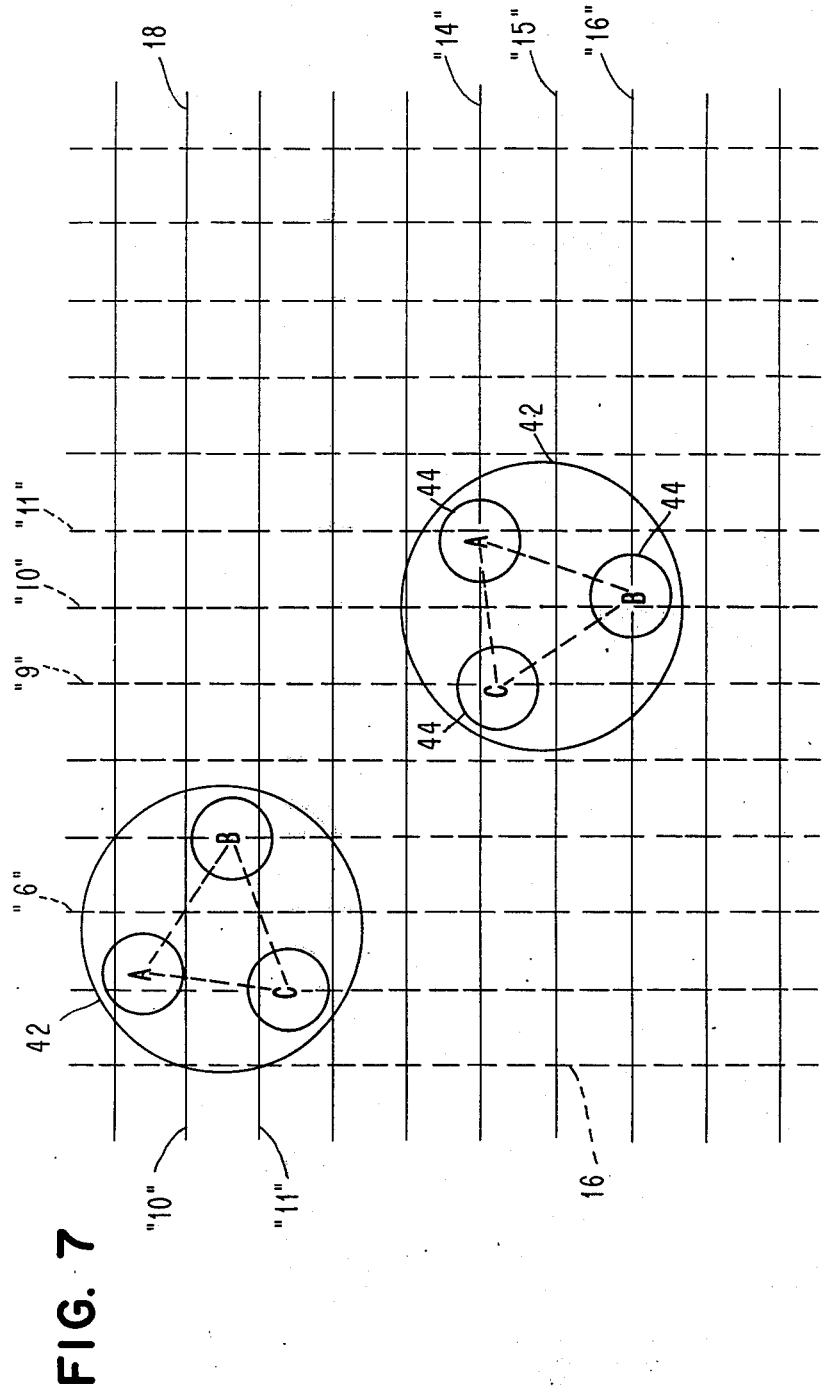
FIG. 7 is a diagrammatic planar representation of a portion of a gas panel with an overlay showing possible stylus positions thereon.

Referring now to FIG. 7 there is shown a portion of a gas panel display and represented thereon are a series of spaced column conductors 16 indicated in phantom and extending at right angles to the column conductors is a similar series of spaced row conductors 18. Superimposed on the gas panel at the lower right area of the panel is a representation of the tip 42 of the hand-held stylus with the three spaced equal plate areas 44 A, B and C being shown as they might appear with a random engagement of the sensor with the panel. Assume the column conductors at the general area of the engaged stylus are numerical column conductors 9, 10 and 11, counting from the left end of the panel. Similarly, assume the row conductors at the area of engagement are numeric row conductors 14, 15 and 16, respectively, form the top of the panel. It is evident from examination of the stylus overlay that column conductor 10 is approximately mid-point between plates A and C while row conductor 15 is also similarly approximately mid-point between plates A and B.

Assume now that it is desired to "detect" the position of the stylus on the gas panel. As described before, the column conductors are accordingly "rippled" from left to right as described when the stylus tip engages the panel, initiation or sensing being controlled by a pressure sensitive micro-switch in the stylus which is closed when the tip engages the gas panel surface.

When the ripple or sense pulse drives column conductor 10 between plates A and C, the voltage envelope induced on each plate A and C will be substantially identical in shape with the signal envelope on plate C being time displace to the right. This is the same action previously described relative to the two-plate stylus and the waveform is substantially as previously described relative to FIG. 4. The waveform envelope on plate A is applied (FIG. 6) through conductor 52, and capacitance input network generally indicated 53 to minus input of a conventional differential amplifier 54. Similarly, the waveform envelope on plate C is applied through conductor 56, a capacitance input network generally indicated 57, to the plus input of the differential amplifier 54. So connected the amplifier 54 and associated capacitance networks 53 and 57 and plates 44A and 44C form what is conventionally called a "differential charge amplifier". The two waveforms A and C inputed to separate inputs of the amplifier 54 substantially cancel each other out in a well-known manner in the amplifier as indicated previously at detect point 37 during the description of FIG. 5. The resultant zero signal level of amplifier 54 is applied through conductor 59 to the input of a standard zero detect circuit 60. The zero detect circuit 60 when its input is near zero or in effect the absolute value of VA-VC is near zero generates a digital "1" output on output conductor 61. The output of Zero Detect circuit 60 is a digital zero when there is any signal level significantly other than zero on its input. In the conditions stated above wherein the amplifier output is zero at the "detect" point, a "1" output level is accordingly generated on conductor 61 and applied to an AND circuit 62.

Similarly, another differential charge amplifier is formed by an amplifier 63, capacitance networks 64, 65 and connected via conductors 66 and 67 to plates 44A and 44B, respectively. The output of this second amplifier 63 is connected to a zero detector 68 which is identical in function to zero detector 60. The output of 68 is fed via conductor 70 to a second input of the AND circuit 62.

The output of the AND circuit 62, which appears on conductor 71, is a digital "1" only when a gas panel row or conductor is pulsed within the triangular region 72 formed by the imaginary lines joining the centers of plates 44 A, B and C as indicated in FIG. 6. When a gas panel row or column conductor outside of this triangular region is pulsed it is impossible for the outputs of amplifiers 54 and 63 to be both simultaneously zero, hence the output of the AND circuit 62 is a digital zero. By this arrangement of the A, B, C plates 44, amplifiers 54, 63 and zero detectors 60, 68 and the AND function provided by circuit 62, the desired stylus position detecting function is preserved no matter how the stylus plates 44 are oriented with respect to the gas panel conductors.

FIG. 7 illustrates two possible orientations in the normal use of the hand-held stylus. In the case illustrated in the upper left, row line 10 or 11 and column line 6 would be the detected position of the stylus. In the case illustrated in the lower right, row line 15 and column line 10 would be the detected position.

As described false detects can be caused by a faulty or inoperative gas panel conductor driver or when the pulse gas panel conductor is very far from the stylus. Accordingly, a non-differential charge amplifier and signal detector is provided to rule out these cases. Returning to FIG. 6, one of the plates 44 (B is shown) is connected via conductors 74 and 75 to the input of a non-differential charge amplifier 76 which feeds a threshold detector 78. The detector 78 is of standard construction and will generate a logical "1" output on conductor 79 when its input is above a predetermined threshold level $V_{th}$. The threshold level $V_{th}$ is adjusted through network generally designated 80. The output of 78 appearing on conductor 79 is a "1" when there exists a pulsed gas panel conductor which is within the sense range of the stylus (the sense range is set by $V_{th}$). Signals on conductors 71 and 79 are fed to an AND circuit 82, the output of 82 appears on conductor 83 and this signal is designated as "stylus detect". The "stylus detect" is a logical "1" only when: (1) no false detect conditions exist, and (2) the pulsed gas panel conductor is within the detect triangle 72. When either conditions (1) and (2) are not satisfied the "stylus detect" signal is a logical "zero".

It will be appreciated that when a detect signal is signaled on terminal 83 during either the row or column scan, the generation of the detect signal is coincident with the timing of the circuitry applying the ripple signal to the row or column conductor at that instant. Circuitry to be described utilizes this coincidence to generate a row and column address signal for the detect position.

The above sensing of a row and column detect by the three-plate stylus and associated circuitry operate in an environment where the spacing of the conductors relative to the dimensions and spacing of the three plates 44 was in the dimensional range noted. If the gas panel conductor density is doubled, for example, the stylus will still operate. Under these circumstances there could be three of four row or column conductors arrange between the plate pairs AC and AB on a random engagement of the stylus with panel. On a rippling of the sense pulse through the conductors, the plate pairs AC and AB operate to select the one conductor closest to the mid-point therebetween so that a zero detect is signaled as before.

Figure 9:
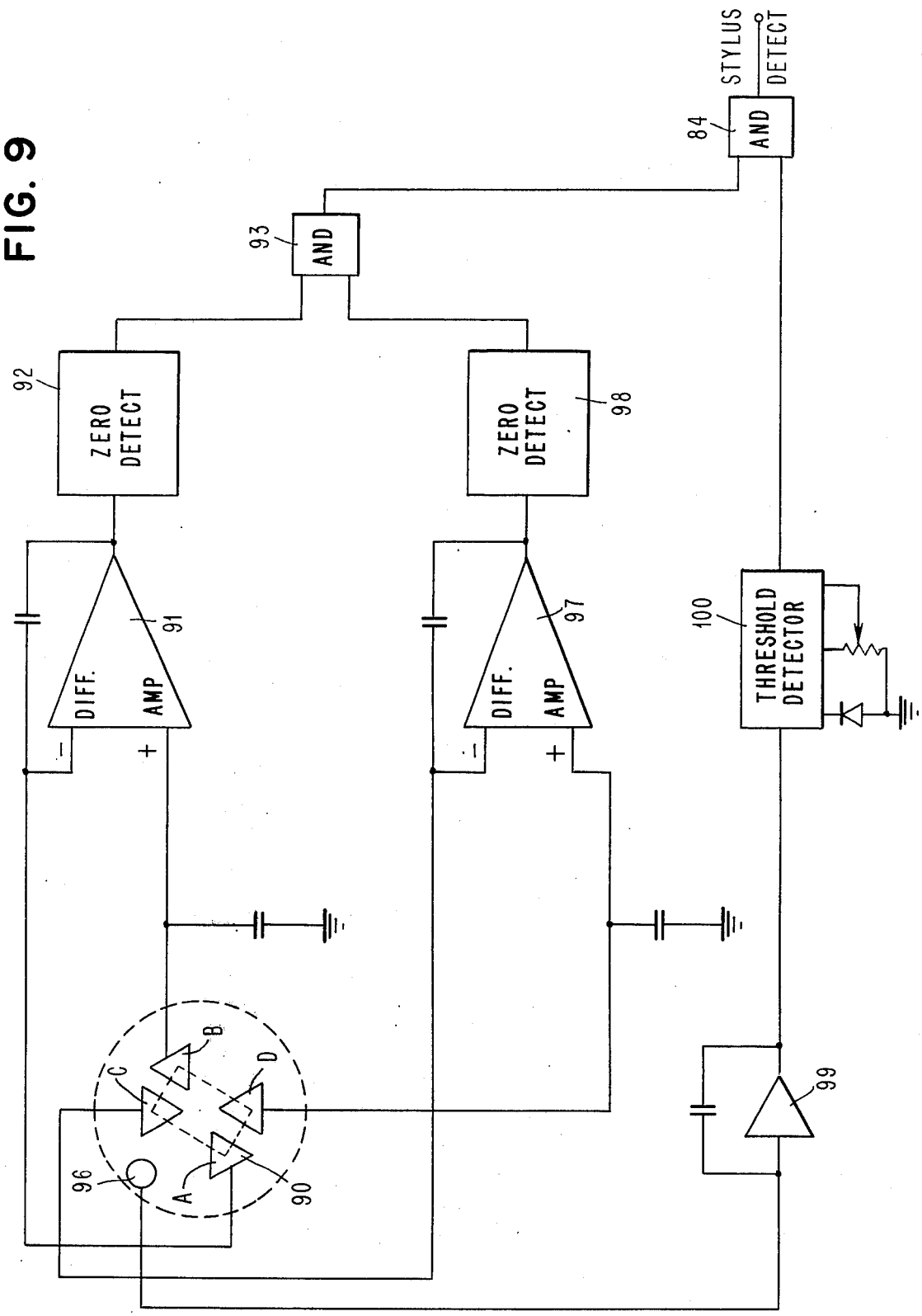
FIG. 9 is a circuit diagram of an alternate embodiment of the invention with a sense stylus having four spaced sense plates with their associated circuitry.

Referring now to FIG. 9 there is shown an alternate form of the invention wherein the capacitive sense tip area of the hand-held stylus comprises four spaced plate areas 90A, B, C and D of equal areas. Oppositely arranged plates A and B drive respective inputs of a differential amplifier 91, the output of which in turn drives zero detect circuit 92, OR circuit 93 and one input of AND circuit 84. Similarly, oppositely arranged places C and D drive respective inputs of a differential amplifier 97 the output of which in turn drives zero detect circuit 98, the other input of AND circuit 93 and finally one input of AND circuit 84. The region of detect is described by imaginary lines joining the centers of plates A, B, C, D. It is a parallelogram as contrasted with a triangle for the three plate device. A separate fifth plate area 90 arranged near the periphery of the stylus drives threshold detector 91 the output of which drives the other input of AND circuit 84. The operation of the circuit in FIG. 9 is substantially similar to that previously described for FIG. 7, in that during either a column or row line ripple, a related pair of signals induced on sensor pair A and B, or C and D (dependent on the random orientation of the tip on the gas panel display) effects through the related differential charge amplifier 91 or 97, as the case may be, and the respective zero detect circuit 92 or 98, a driving of the AND circuit 83 to raise one input to AND circuit 84. The sense action ripple induces a voltage of suitable magnitude on a fifth plate 96, and through non-differential charge amplifier 99 and threshold detector 100, drives the other input of the AND 84 to signal a column or row "detect". With both a column and row detect sequentially generated, a cell detect is signaled as before. The fifth plate area 96 need not be in the form indicated but could, if desired, be actually an enlarged area extending around the circumference of the tip area or it may be one of the plates 90A, B, C or D.

Figure 8:
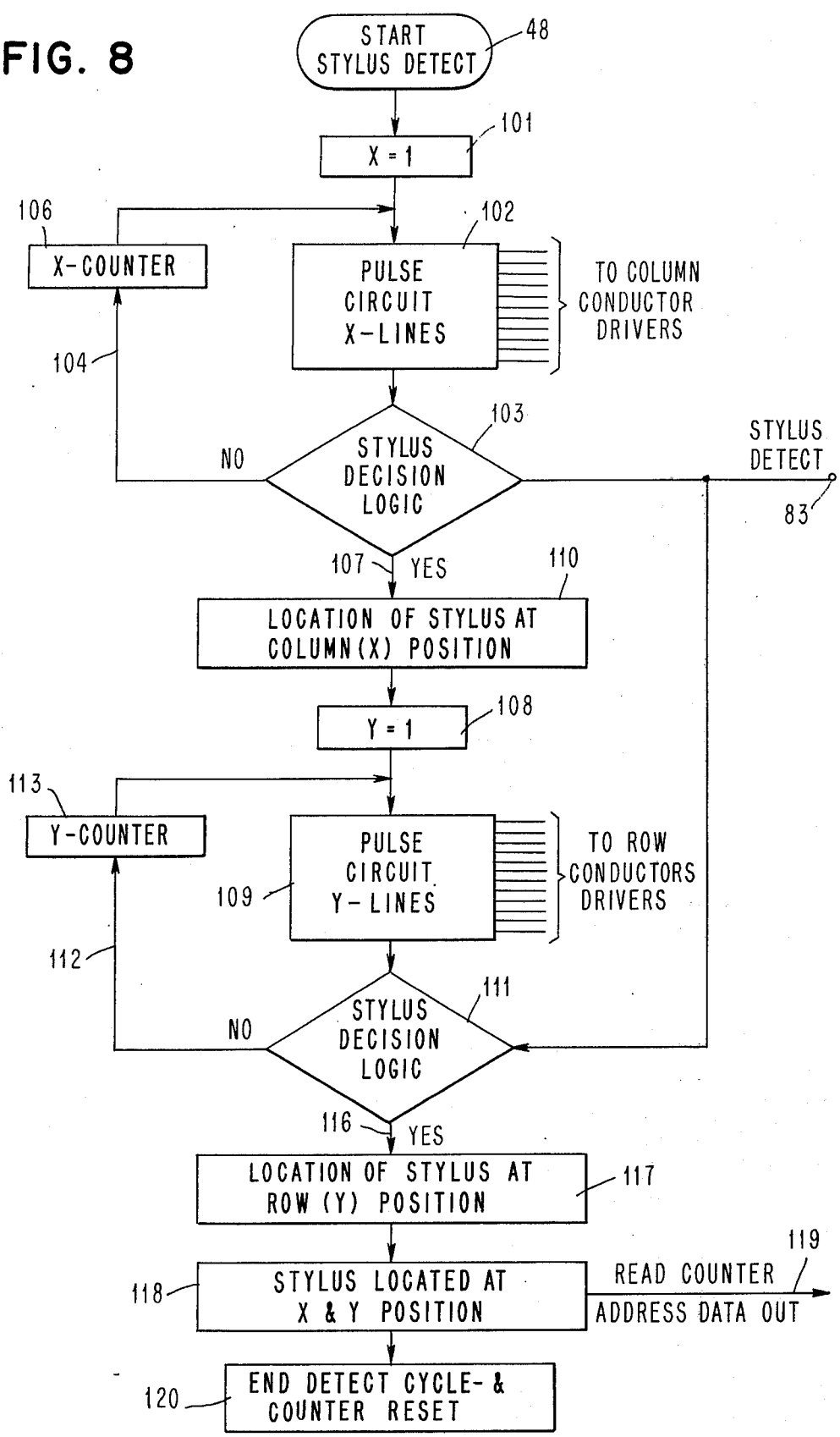
FIG. 8 is a logical block diagram of a circuit for applying the ripple voltages to the row and column conductors for a sense operation and also generating the coordinate address data during a detect operation.

Referring now to FIG. 8 there is shown in block diagram format the logic circuitry for effecting the sequential application of the sense pulse to the column (X) conductors and then, in turn the row (Y) conductors to effect the stylus sense operation. With the engagement of the stylus with the panel, the engagement force deflects the stylus tip 42 assembly within the housing 40a (FIG. 11) to close the previously mentioned switch 48 and a circuit is completed to the (X = 1) drive block 101. The actuation of circuit 101 energizes the pulse column drive circuit 102 to apply a sense pulse to the leftmost or 1 column conductor of the display. Assuming no stylus detect signal "detect" output terminal 83 from FIG. 6, stylus detect decision block 103 actuates the NO detect output line 104 to advance X counter or column 106 to the next count. The advance count form 106 actuates pulse circuit 102 to apply the sense pulse to the second column conductor. This advancing of the X counter 106 continues step by step to accordingly cause the pulse circuit 102 to successively pulse succeeding column conductors until a stylus detect signal on conductor 83 is routed through stylus detect logic 103 to the YES output 107. With YES line 107 activated, a column conductor located circuit 110 is activated, and the X counter 106 of course stops with its count at the "detect" column. The activation of the circuit 110 activates a Y = 1 drive line 108.

The activation of the Y = 1 drive circuit 108 energizes the row conductor drive circuitry 109 to apply a sense pulse to the 1 (topmost) row conductor. Assuming no resultant "detect" signal generated by the scanning of the row conductor, terminal 83 remains down and a stylus detect decision block 111 brings up the NO output 112 to advance a Y or row counter to a 2 count position. This in turn activates the pulse row line circuitry 109 to generate a sense pulse on the next sequential row conductor. The advancing of the Y counter continues, step by step, to control the application of the sense pulse to succeeding Y or row conductors until a stylus detect signal appears on terminal 83 from FIG. 6. The stylus detect signal on terminal 83 as a result of a row "detect" acts through row detect decision block 111 to suspend advance signals to the Y counter 113 and suspend the row sense operation. Logic circuit 111 also activates YES output conductor 116 to signal circuit 117 that the "row" has been detected, which in turn activates circuit 118 to indicate that both the column and row positions of the stylus have been detected. The activation of circuit 118 activates conductor 119 to cause the address count in both the X (column) counter 106 and Y (row) counter 113 to be read out and signal the coordinate position of the sense stylus on the panel. The activation of circuit 118 in turn activates end circuit 120 to indicate the end of this particular stylus detect operation. A complete operation of the improved stylus detector and its associated circuitry have, accordingly, been described in achieving a very accurate coordinate location of the stylus on the gas panel.

The X counter 106 and Y counter 113, and the associated X drive and Y drive circuitry 102 and 109, respectively, shown in simplified form in FIG. 8 are the conventional addressing circuitry used in the gas display panel as described in more detail in the above-noted application. Accordingly no material circuit changes are required to adapt the subject multi-plate sense stylus and its associated circuitry shown in FIG. 6 for use with a gas panel display.

The foregoing describes a line by line sequential sense pulsing of the row and column conductors, but it is appreciated that some other pulsing sequence can be used, such as every eight conductors in a "coarse" mode, then the stylus is located among these eight line by line in a "fine" mode.

While the multi-plate stylus and its associated circuitry have been described in the environment of a gas panel display, it will be appreciated that the device is capable of determining its X-Y position relative to any display device (flat or otherwise) which contains matrix type address conductors to display elements of some type. It will also be appreciated that since the improved stylus device "detects" the coordinate intersection position of the particular row and column conductor, whether the associated "cell" is illuminated or extinguished, the device may be readily adapted to serve as a graphic input device for any information handling system.

For example, FIG. 10 is a simplified view of a graphic data input device having a record sheet 120 overlaying a panel 121 having the coordinate row 122 and column conductors 123 arranged thereon. Adapted for engagement with the record sheet is a free moving stylus essentially similar to that previously explained with a recording pen or pencil member arranged at the tip area for writing or tracing on the record sheet 120. This arrangement accordingly permits the stylus to write or trace on the record sheet as the operator desires, and at the same time by activating the column and row sense operation as before, the data as written or traced is translated into the coordinate X-Y data as before for direct entry into any data handling device.

There has, accordingly, been described an improved sense stylus and associated circuitry for cooperation with a display or other panel having a matrix or row and column coordinate conductors where the position of the stylus on the panel may be accordingly determined in an accurate and economical manner. Additionally, when the stylus is utilized with a gas panel display, the normal addressing and driving circuits used in the display can be used in the stylus sensor operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a gas panel display having row and column coordinate conductors forming a matrix of selectable light emitting cells and including control means for selectable writing or igniting desired cells, erasing or extinguishing previously written cells, and sustaining previously written cells in the ignited state, sensor apparatus for signaling the coordinate position of a stylus on the display, comprising:
    a hand-held stylus having a narrowed tip area for engagement with said display means;
    at least three spaced sense members in said tip each said member being of equal area;
    means for applying a sense signal pulse successively to each or some sub-set of said column conductors for initiating a column sense operation, and successively to each or some sub-set of said row conductors for initiating a row sense operation;
    differential amplifier means responsive to signals generated by said sense pulses on pairs of said sense members positioned on each side of row and column conductors for generating differential sense signals below a predetermined magnitude level for at least one row and column conductor between a pair of sense members;
    signal responsive means responsive to said sense signals below said predetermined level for generating row and column sense signals;
    signal pickup means responsive to a signal exceeding a predetermined level induced in said tip area during the generation of row and column sense signals for generating no false detect signals; and
    logic means responsive to row and column sense signals and coincident no fault detect signals, for generating row and column detect signals signaling the coincident position of the stylus on the gas panel.

2. Sensor apparatus according to claim 1 further characterized by addressing means operable through a complete cycle to apply said sense pulses to said row and column conductors; and
    means jointly responsive to row and column detect signals and said addressing means for generating the coordinate address of the stylus position on said gas panel.

3. Sensor apparatus according to claim 2 wherein said stylus tip includes a triggering member operable when said stylus engages the display panel for initiating a complete cycle of said addressing means.

4. Sensor apparatus according to claim 3 wherein said triggering member is a pressure sensitive device.

5. Sensor apparatus acording to claim 2 wherein said sense signal pulses applied to said row and column conductors are of a limited magnitude insufficient to ignite any extinguished cell or disturb an ignited cell, said sensor apparatus being operable to detect the cell position of any ignited or extinguished cell.

6. Sensor apparatus according to claim 1 wherein said signal pickup means is one of said spaced sense members in said tip.

7. Apparatus according to claim 1 wherein said narrowed tip area of said stylus is larger than the spacing of said row and column conductors so that said tip area spans a number of row and column conductors.

8. In an information display panel having row and column coordinate conductors forming a matrix of selectable light emitting cells and including control and addressing means for selectable writing or igniting desired cells, selectively erasing or extinguishing previously written cells, and cell memory function means for maintaining previously written cells in the ignited state until erased, sensor apparatus for signaling the coordinate position of a stylus on the display, comprising:
    a hand-held stylus having a narrowed tip area for engagement with said display panel, said narrowed tip area including at least three mutually isolated, symmetrically arranged signal pickup members;
    addressing and control means operable through a complete cycle to apply a sense pulse successively to each or some sub-set of said row and column conductors, said pulses inducing signals in said pickup means;
    differential analyzer means responsive to said signals induced by said sense pulses in pairs of pickup means positioned on each side of row and column conductors for generating respective row and column sense signals;
    signal pickup means in said stylus tip and associated threshold circuit means for generating threshold sense signals when signals induced thereon by said sense pulses exceeds a threshold level; and
    logic means jointly responsive to said generated row and column sense signals, threshold signals, and said addressing means for generating a coordinate address signal representative of the coordinate position of the stylus on the display.

9. Sensor apparatus according to claim 8 wherein said differential analyzer means operates to differentially compare signals in pairs of said pickup means for a zero differential pickup signal, said zero signals effecting generation of related row and column sense signals.

10. Sensor apparatus according to claim 8 wherein said pickup members in said stylus are capactive pickup areas.

11. Sensor apparatus according to claim 10 wherein said signal pickup means in said stylus tip area for driving said threshold means is one of said capacitive pickup areas.

12. Sensor apparatus according to claim 8 wherein said addressing means for selecting each row and column conductor for applying a sense pulse thereto, is the same addressing means utilized for selectably writing and erasing desired cells in said gas panel display.

13. A system for locating the position of a substantially free stylus with respect to coordinate matrix of row and column conductors disposed on a panel and having a record sheet overlaying said panel comprising:
   a hand-held stylus having a narrowed tip area for engagement with said record sheet, said narrowed tip area including at least three mutually isolated, symmetrically arranged signal pickup members;
   addressing and control means operable through a complete cycle to apply a sense pulse successively to each of said row and column conductors, said pulses inducing signals in said pickup means;
   differential analyzer means responsive to said signals induced by said sense pulses in pairs of pickup means positioned on each side of row or column conductors for generating respective row or column sense signals;
   signal pickup means in said stylus tip and associated threshold circuit means for generating a threshold sense signal when a signal induced thereon by said sense pulses exceeds a threshold level; and
   logic means jointly responsive to said generated row and column sense signals, threshold signals, and said addressing means for generating a coordinate address signal representative of the coordinate position of the stylus on the record and panel.

* * * * *